(12) United States Patent
Nakaya

(10) Patent No.: US 11,428,289 B2
(45) Date of Patent: Aug. 30, 2022

(54) ROTARY DAMPER

(71) Applicant: SOMIC MANAGEMENT HOLDINGS INC., Tokyo (JP)

(72) Inventor: Kazumasa Nakaya, Shizuoka (JP)

(73) Assignee: SOMIC MANAGEMENT HOLDINGS INC., Tokyo (JP)

( * ) Notice: Subject to any disclaimer, the term of this patent is extended or adjusted under 35 U.S.C. 154(b) by 44 days.

(21) Appl. No.: 17/058,159

(22) PCT Filed: May 24, 2019

(86) PCT No.: PCT/JP2019/020600
§ 371 (c)(1),
(2) Date: Nov. 24, 2020

(87) PCT Pub. No.: WO2019/230584
PCT Pub. Date: Dec. 5, 2019

(65) Prior Publication Data
US 2021/0164535 A1  Jun. 3, 2021

(30) Foreign Application Priority Data

Jun. 1, 2018 (JP) .............................. JP2018-106260

(51) Int. Cl.
*F16F 13/00* (2006.01)
*F16F 9/14* (2006.01)

(52) U.S. Cl.
CPC ............ *F16F 13/007* (2013.01); *F16F 9/145* (2013.01); *F16F 2224/0208* (2013.01); *F16F 2232/02* (2013.01); *F16F 2234/02* (2013.01)

(58) Field of Classification Search
CPC .. F16F 13/007; F16F 9/145; F16F 2224/0208; F16F 2232/02; F16F 2234/02
See application file for complete search history.

(56) References Cited

U.S. PATENT DOCUMENTS 4,241,814 A    12/1980 Masclet
2015/0184714 A1  7/2015 Miller et al.

FOREIGN PATENT DOCUMENTS

DE    102014206230 A1 * 10/2015    ............ F16F 15/023
DE    102014206230 A1   10/2015
(Continued)

OTHER PUBLICATIONS

Extended European Search Report dated Feb. 7, 2022 for the corresponding European Patent Application No. 19810101.6.
(Continued)

*Primary Examiner* — Melanie Torres Williams
(74) *Attorney, Agent, or Firm* — Pearne & Gordon LLP

(57) ABSTRACT

Provided is a rotary damper that can be easily changed in specifications and can be improved in economic efficiency by an existing rotary damper that can be continued to be used. A rotary damper 100 includes a main housing 101. The main housing 101 includes a module mounting portions 108 for detachably mounting the other functional module 200 to 500. The functional modules 200 to 500 respectively have module rotors 206, 306, 406 and 506 which are rotationally driven by receiving a rotational driving force from the outside, and module output portions 206b, 307a, 407a and 507a formed to be connectable to a main rotor 110, in module housings 201, 301, 401 and 501. Further, the functional modules 200 to 500 include input adjustment mechanisms 205, 305, 405 and 505 having a function of changing at least one of characteristics of the rotational driving force and modes of transmission of the rotational driving force, between the module rotors and the module output portions.

6 Claims, 10 Drawing Sheets

(56) References Cited

FOREIGN PATENT DOCUMENTS

| | | |
|---|---|---|
| JP | 2003-206972 A | 7/2003 |
| JP | 2004-150561 A | 5/2004 |
| JP | 2006-9849 A | 1/2006 |
| JP | 2012-202498 A | 10/2012 |
| JP | 2013-181594 A | 9/2013 |
| JP | 2017-187140 A | 10/2017 |
| WO | WO-2017064316 A1 * | 4/2017 ............. B60N 2/002 |

OTHER PUBLICATIONS

International Search Report (ISR) dated Jul. 2, 2019 filed in PCT/JP2019/020600.

* cited by examiner

ROTARY DAMPER

TECHNICAL FIELD

The present invention relates to a rotary damper used as a kinetic energy damping device in a rotating mechanism in a four-wheeled or two-wheeled self-propelled vehicle or industrial machinery and equipment.

BACKGROUND ART

Conventionally, in the four-wheeled or two-wheeled self-propelled vehicle or the industrial machinery and equipment, the rotary damper as the kinetic energy damping device has been used in the rotating mechanism. For example, PATENT LITERATURE 1 below discloses the rotary damper. In the rotary damper, a rod-like shaft including a pair of blade-like vanes is supported at both ends in a case formed in a tubular shape.

CITATION LIST

Patent Literature

PATENT LITERATURE 1: JP-A-2013-181594

SUMMARY OF INVENTION

However, in the rotary damper disclosed in PATENT LITERATURE 1, when it is desired to change damping specifications of the rotary damper, since a rotary damper having desired specifications must be newly prepared, there is a problem that it is uneconomical because it is difficult to change the specifications of the rotary damper and an existing rotary damper cannot be used.

The present invention has been made to address the above problems. An object of the present invention is to provide the following rotary damper. With this rotary damper, it is easy to change the specifications. Further, since the existing rotary damper can be continued to be used, economic efficiency can be improved.

In order to achieve the above-described object, a feature of the present invention is a rotary damper which includes a main housing that holds a main rotor rotating against a resistance of a fluid together with the fluid in a state in which the main rotor has at least an exposed portion, including a functional module detachably mounted on the main housing. The main housing has a module mounting portion for detachably mounting the functional module, and the functional module includes: an input adjustment mechanism having both a module rotor that is rotationally driven by receiving a rotational driving force from outside the functional module, and a module output portion that is formed to be connectable to at least the main rotor and transmits the rotational driving force, and having a function of changing at least one of characteristics of the rotational driving force and modes of transmission of the rotational driving force between the module rotor and the module output portion; a module housing that houses the input adjustment mechanism; and an external mounting portion provided on the module housing for detachably mounting the rotary damper.

In this case, the input adjustment mechanism in the functional module changes at least one of the characteristics of the rotational driving force input from outside the functional module and a mode such as a physical configuration or structure relating to the transmission of the rotational driving force. Specifically, the input adjustment mechanism has a function capable of changing at least one of a rotational speed (including a rotation angle), a torque and a direction of rotation as the characteristics of the rotational driving force. Further, the input adjustment mechanism has a function of changing a length, a shaft diameter (or a hole diameter), a direction of formation and a position of formation of a connecting portion of the main rotor as a mode relating to the transmission of the rotational driving force, or a function to add at least one of functions such as shock absorption to the main rotor. Then, the functional module can be configured to include each of the functions alone or to include a plurality of functions at the same time.

According to a feature of the present invention thus configured, the rotary damper detachably includes a functional module including the input adjustment mechanism capable of changing specifications of the rotational driving force input to the main rotor. Therefore, the specifications can be easily changed by mounting a functional module having a desired function. Further, since the existing rotary damper can be continued to be used, the economic efficiency can be improved.

Further, another feature of the present invention is the rotary damper in which the functional module includes a plurality of functional modules having the function of the same type and/or a different type, the module housing includes another module mounting portion for detachably mounting the other functional module, and the module output portion is formed to be connectable to the module rotor in the other functional module.

According to another feature of the present invention thus configured, the rotary damper includes the plurality of functional modules having the function of the same type and/or a different type, and the other module mounting portion for detachably mounting the other functional module. Further, the module output portion is formed to be connectable to the module rotor in the other functional module. Therefore, since the functional modules of the same type and/or a different type can be mounted on a rotary damper 100, the specifications of the rotational driving force can be changed in a wider variety of ways. The other module mounting portion can be shared with the external mounting portion.

Further, another feature of the present invention is the rotary damper in which the module mounting portion includes a plurality of female threads formed at different positions around the main rotor in the main housing, and the external mounting portion and the other module mounting portion include common through-holes which are formed at positions respectively facing the plurality of female threads and through which male threads screwed into the female threads can pass.

According to another feature of the present invention thus configured, the module mounting portion includes the plurality of female threads formed at different positions around the main rotor in the main housing. Further, the external mounting portion and the other module mounting portion include the common through-holes which are formed at the positions respectively facing the female threads and through which the male threads screwed into the female threads can pass. Therefore, the functional modules can be easily mounted on the main housing with a long male thread in a continuous structure.

Further, another feature of the present invention is the rotary damper in which the main rotor is formed in a rod shape projecting from the main housing and connected to the input adjustment mechanism.

According to another feature of the present invention thus configured, in the rotary damper, the main rotor is formed in a solid rod shape projecting from the main housing and connected to the input adjustment mechanism. Therefore, a radial structure of the rotary damper can be made more compact than when the main rotor is formed in a tubular shape.

Further, another feature of the present invention is the rotary damper in which the main housing and the module housing include positioning fitting portions that are fitted to each other to determine their positions on surfaces facing each other when they are connected to each other.

According to another feature of the present invention thus configured, in the rotary damper, the main housing and the module housing include positioning fitting portions that are fitted to each other to determine their positions on surfaces facing each other when they are connected to each other. Therefore, positioning when connecting the functional module to the main housing can be easily performed, so that a connecting operation can be easily performed in a short time.

Another feature of the present invention is that in the rotary damper, the main housing includes a main rotor peripheral wall that surrounds a periphery of the exposed portion of the main rotor and is in close contact with the module housing, in a portion facing the module housing when the module housing is connected to the main housing.

According to another feature of the present invention thus configured, in the rotary damper, the main housing includes the main rotor peripheral wall that surrounds the periphery of the exposed portion of the main rotor and receives the module housing, in a portion facing the module housing when the module housing is connected to the main housing. Thus, it is possible to prevent liquid such as water or oil and foreign matter such as dust from adhering to or entering a connecting portion between the main rotor and the input adjustment mechanism, and its surroundings. Therefore, an operation of the rotary damper can be stabilized for a long period of time.

Another feature of the present invention is that in the rotary damper, the module housing includes a module rotor peripheral wall that surrounds a periphery of an exposed portion of the module rotor and is in close contact with a module mounting target to which the module rotor is connected. Here, the exposed portion of the module rotor is a shaft-like or tubular portion that projects from the module housing or is exposed through an opening, so that the module rotor is connected to the other functional module or a mounting target output portion, which is a portion to which the rotational driving force is output, in a mounting target of the rotary damper.

According to another feature of the present invention thus configured, in the rotary damper, the module housing includes the module rotor peripheral wall. The module rotor peripheral wall is provided in a portion facing the module mounting target when the module mounting target is connected, such as the rotary damper, the other functional module, or a final mounting target of the rotary damper. The module rotor peripheral wall surrounds the periphery of the exposed portion of the module rotor and receives the module mounting target. Thus, it is possible to prevent the liquid such as water or oil and foreign matter such as dust from adhering to or entering a connecting portion between the module rotor and the module mounting target, and its surroundings. Therefore, the operation of the rotary damper can be stabilized for a long period of time.

Another feature of the present invention is that in the rotary damper, the input adjustment mechanism includes an elastic body that applies an elastic force to the module rotor against its direction of rotation.

According to another feature of the present invention thus configured, in the rotary damper, the input adjustment mechanism includes the elastic body that applies the elastic force to the module rotor against the direction of rotation. Therefore, since an impact on the module rotor in the direction of rotation is absorbed, the rotary damper can function as a shock absorbing device.

DESCRIPTION OF EMBODIMENTS

Figure 1:
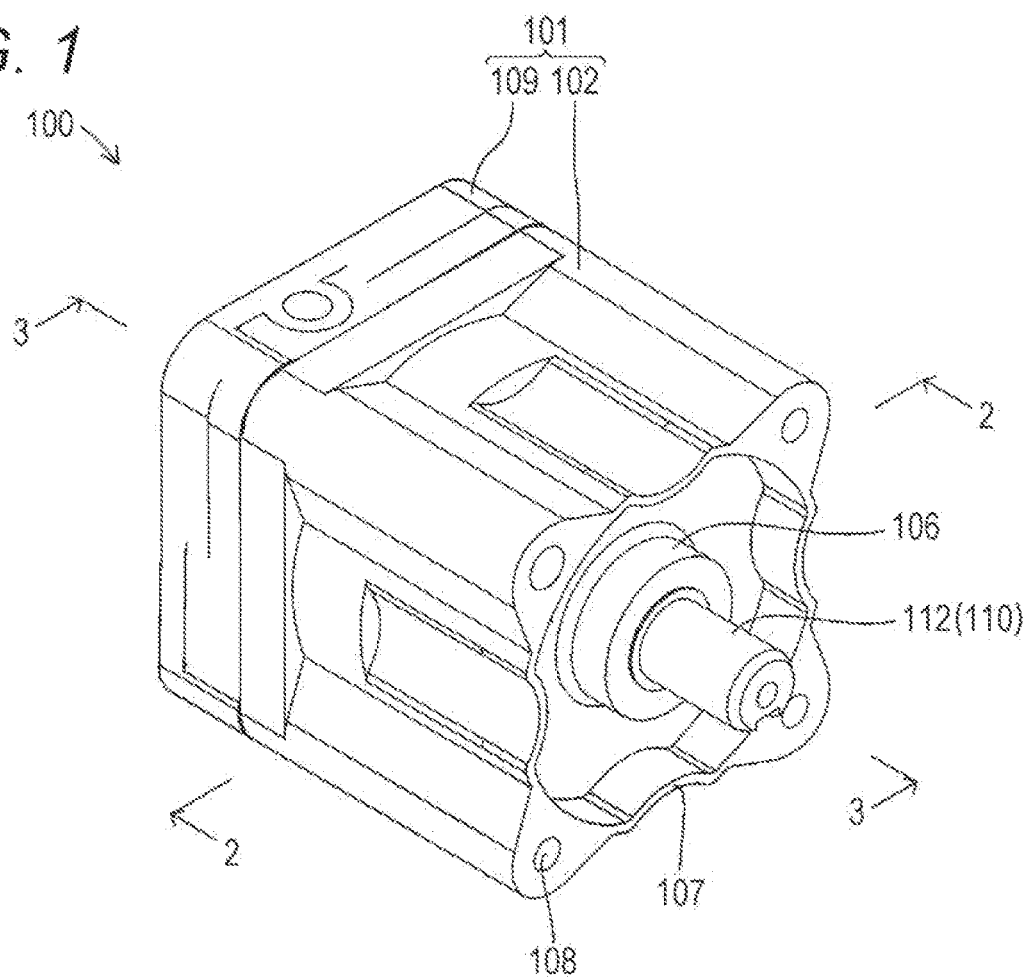
FIG. 1 is a perspective view schematically illustrating an external configuration of a rotary damper according to the present invention.
Figure 2:
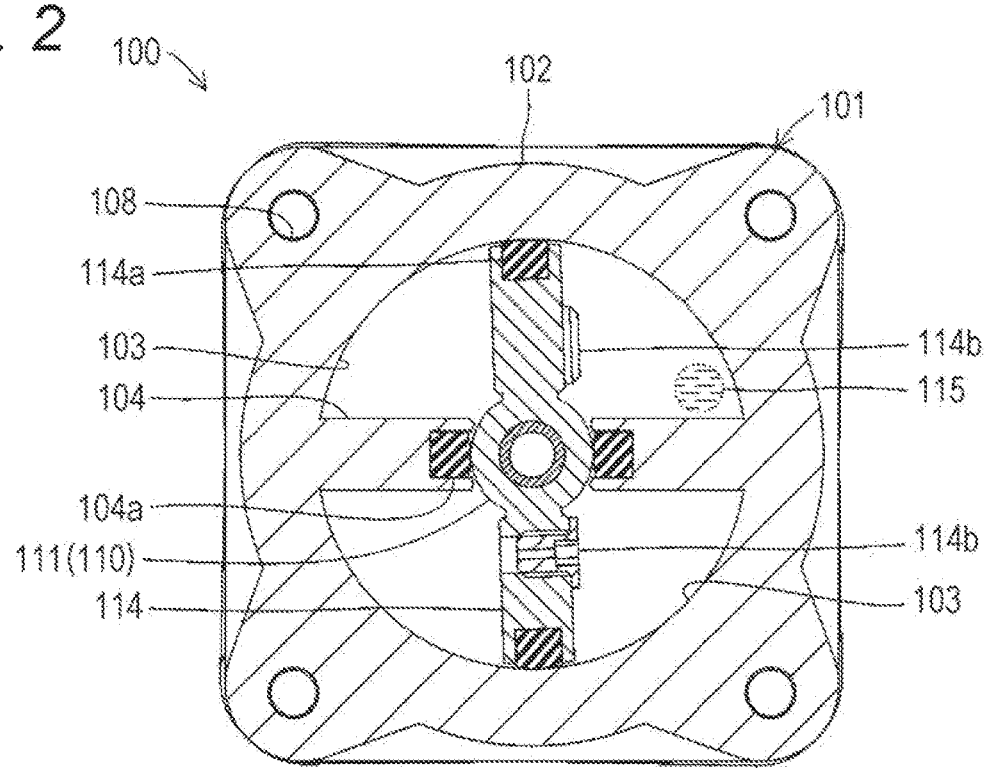
FIG. 2 is a cross-sectional view illustrating a schematic structure of the rotary damper taken along a line 2-2 shown in FIG. 1.
Figure 3:
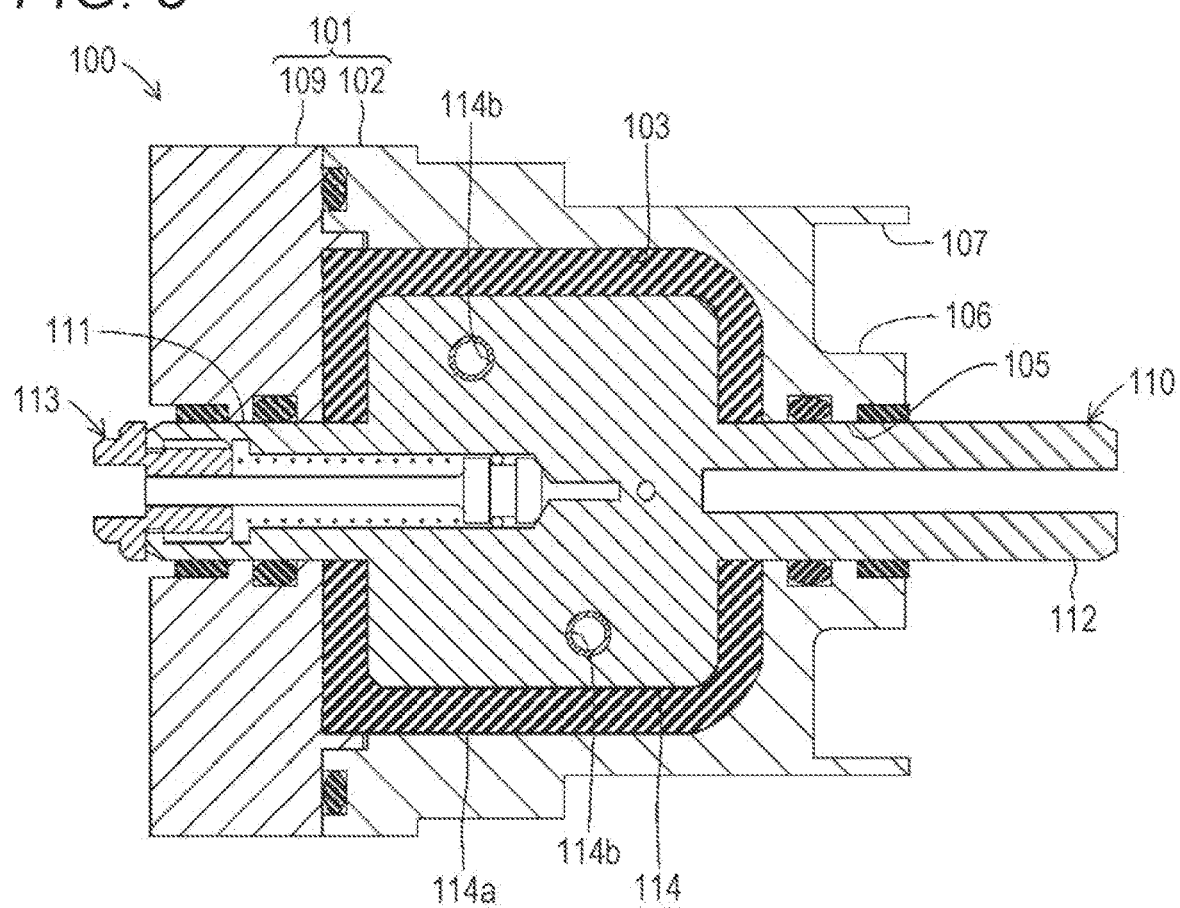
FIG. 3 is a cross-sectional view illustrating the schematic structure of the rotary damper taken along a line 3-3 shown in FIG. 1.
Figure 4:
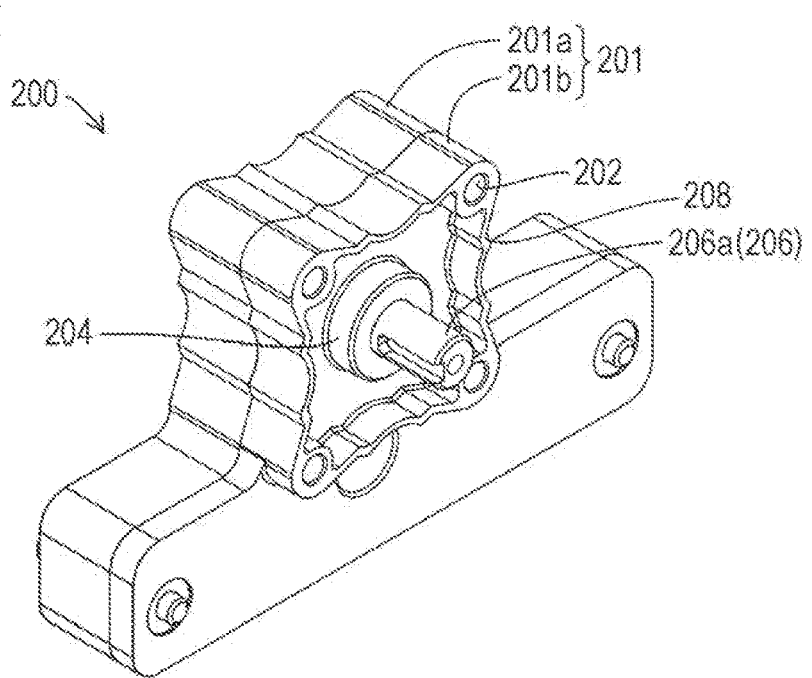
FIG. 4 is a perspective view schematically illustrating an external configuration of a functional module (shock absorbing function) connected to the rotary damper according to the present invention.
Figure 5:
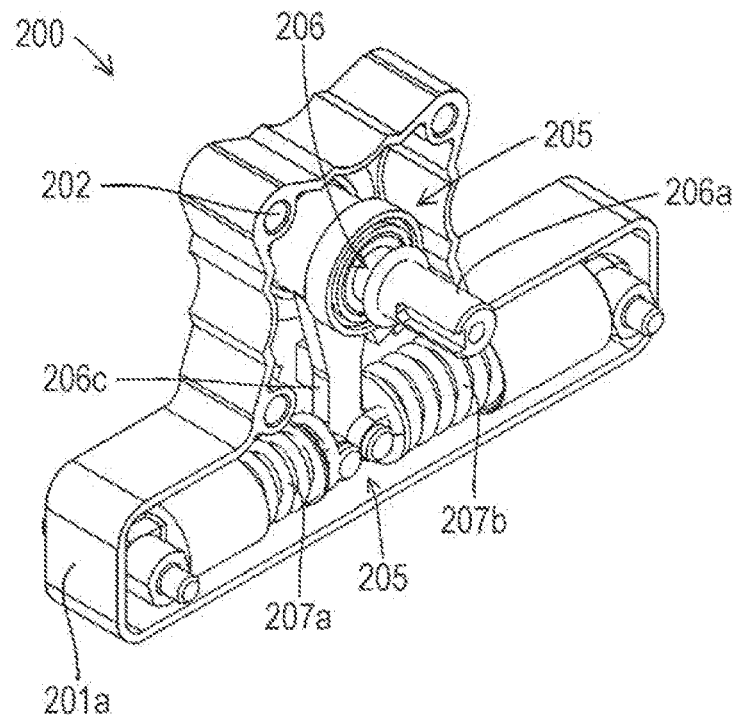
FIG. 5 is a perspective view illustrating an internal structure of the functional module shown in FIG. 4 with a lid omitted.
Figure 6:
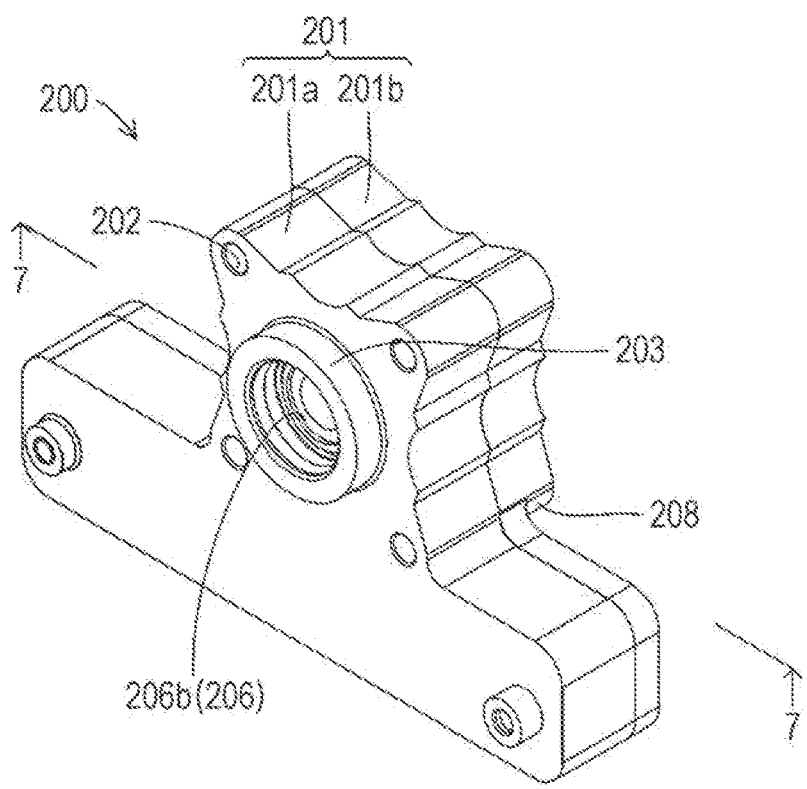
FIG. 6 is a perspective view schematically illustrating an external configuration of an opposite side of the functional module shown in FIG. 4.
Figure 7:
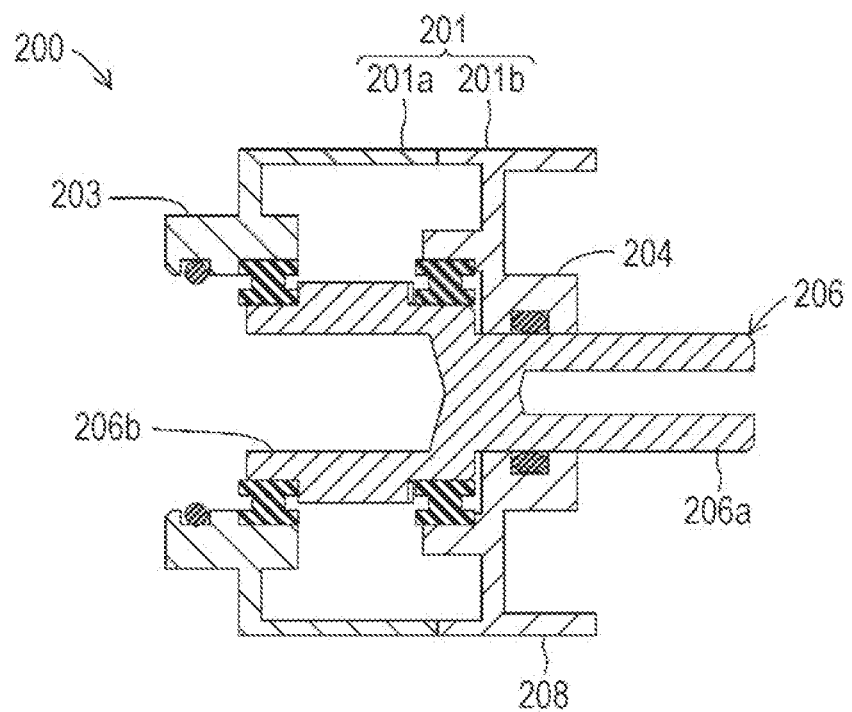
FIG. 7 is a cross-sectional view illustrating a schematic structure of the functional module taken along a line 7-7 shown in FIG. 6.
Figure 8:
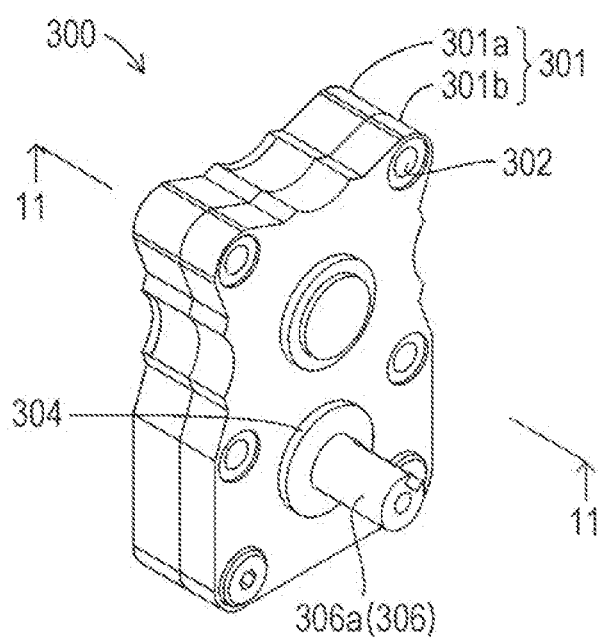
FIG. 8 is a perspective view schematically illustrating an external configuration of another functional module (acceleration function) connected to the rotary damper according to the present invention.
Figure 9:
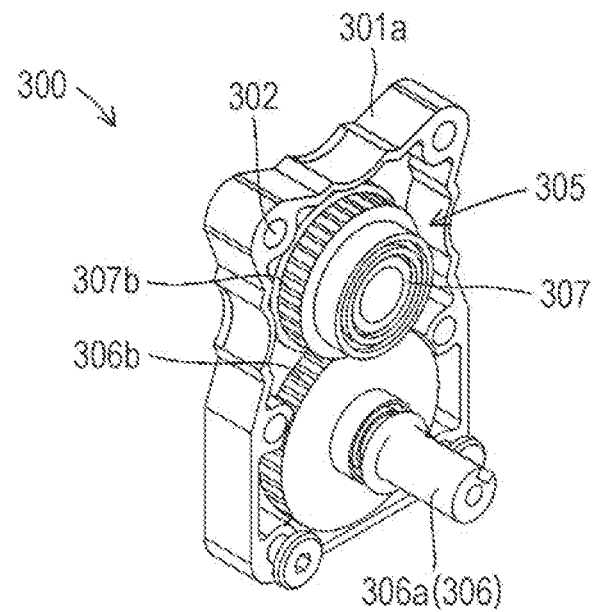
FIG. 9 is a perspective view illustrating the internal structure of the functional module shown in FIG. 8 with the lid omitted.
Figure 10:
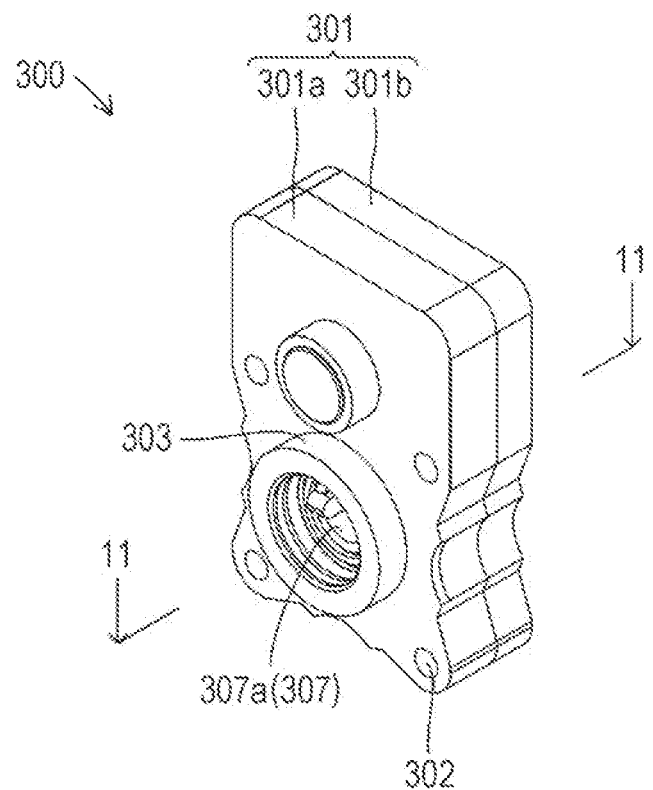
FIG. 10 is a perspective view schematically illustrating the external configuration of the opposite side of the functional module shown in FIG. 8.
Figure 11:
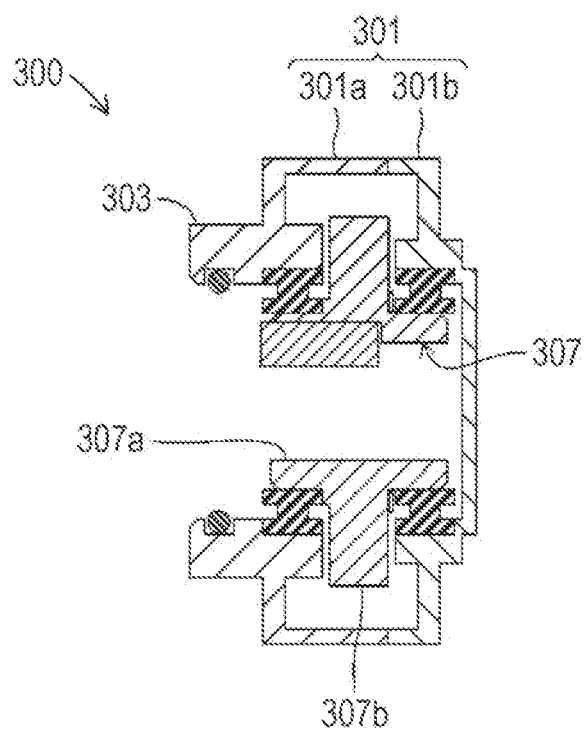
FIG. 11 is a cross-sectional view illustrating the schematic structure of the functional module taken along a line 11-11 shown in each of FIGS. 8 and 10.

Hereinafter, an embodiment of the rotary damper according to the present invention will be described with reference to the drawings. FIG. 1 is a perspective view illustrating an outline of an external configuration of a rotary damper 100 according to the present invention. FIG. 2 is a cross-sectional view illustrating a schematic structure of the rotary damper 100 taken along a line 2-2 shown in FIG. 1. FIG. 3 is a cross-sectional view illustrating the schematic structure of the rotary damper 100 taken along a line 3-3 shown in FIG. 1. Each figure referred to in the present specification includes a portion schematically illustrated in order to facilitate understanding of the present invention, and for example, some components are exaggerated. Therefore, dimensions, ratios and the like between the components may differ. The rotary damper 100 is a damping device for damping kinetic energy, when mounted directly on a mounting target (not shown) having a movable portion, or mounted on a prototype of the mounting target and the movable portion moves. Mounting targets having a movable portion include a reclining mechanism of a seat, a tailgate, an opening and closing mechanism of a glove box in an automobile, a base end of a swing arm that vertically movably supports a rear wheel of a two-wheeled self-propelled vehicle (motorcycle), a hinge portion of an opening and closing door of a furniture, an elevating mechanism of an elevating shelf, and the like.

(Structure of Rotary Damper 100)

The rotary damper 100 includes a main housing 101. The main housing 101 is a component that constitutes a housing of the rotary damper 100 while rotatably holding a main rotor 110. The rotary damper 100 is formed by forming an aluminum material, an iron material, a zinc material, or various resin materials such as a polyamide resin into a hollow shape. More specifically, the main housing 101 is formed in a rectangular parallelepiped shape having an outer shape extending in an axial direction of the main rotor 110. In this case, the main housing 101 is formed in a square shape when viewed from the axial direction of the main rotor 110. The main housing 101 mainly includes a housing body 102 and a lid 109.

The housing body 102 is a component that houses a movable vane 114 of the main rotor 110 and a fluid 115 and rotatably supports one end of a shaft body 111 of the main rotor 110. The housing body 102 is formed in a bottomed cylindrical shape in which one end of a tubular body has a large opening and the other end thereof has a small opening. More specifically, the housing main body 102 is formed with a cylindrical inner chamber 103 and a cylindrical rotor support portion 105. The inner chamber 103 is formed on the large opening side at the one end of the tubular body. The rotor support portion 105 is formed in an open state at a bottom of the inner chamber 103.

The inner chamber 103 is a space for housing the movable vane 114 of the main rotor 110 and the fluid 115 in a liquid-tight manner. The inner chamber 103 includes two semi-cylindrical spaces facing each other via the main rotor 110 that is disposed in a central portion of the housing body 102. In this case, a fixed vane 104 is integrally formed with the housing body 102 in each of the two semi-cylindrical spaces in the inner chamber 103.

The fixed vane 104 is a wall-like portion that divides an inside of the inner chamber 103 into a plurality of spaces together with the main rotor 110. The fixed vane 104 is formed to project inward from an inner wall surface of the inner chamber 103 in the axial direction of the housing body 102. In the present embodiment, the inside of the inner chamber 103 is divided into four individual chambers by the main rotor 110 and two fixed vanes 104 arranged to face each other. Each of the fixed vanes 104 has a groove recessed in a U-shape that is formed in its outer edge portion. A seal body 104a made of an elastic material such as a rubber material is fitted in the groove.

The rotor support portion 105 is a cylindrical portion that rotatably supports the one end of the shaft body 111 of the main rotor 110. In this case, an inner peripheral portion of the rotor support portion 105 supports the shaft body 111 of the main rotor 110 via a bearing and a sealing material such as packing in a liquid-tight manner. Further, a main-side positioning fitting portion 106 is formed on an outer peripheral portion of the rotor support portion 105.

The main-side positioning fitting portion 106 is a portion in which first module-side positioning fitting portions 203, 303, 403 and 503, which will be described below, fit. The main-side positioning fitting portion 106 is formed in a circumferential surface shape in which the first module-side positioning fitting portions 203, 303, 403 and 503 slide and fit. A main rotor peripheral wall 107 is formed on an outside of the main-side positioning fitting portion 106.

The main rotor peripheral wall 107 is a portion for preventing foreign matter such as liquid including water, oil or the like and dust from adhering to and entering a connecting portion between the main-side positioning fitting portion 106 and the first module-side positioning fitting portions 203, 303, 403 or 503, and its surroundings. The main rotor peripheral wall 107 is formed by raising four outer edge portions of the surface of the main housing 101 on a side to which functional modules 200 to 500 are connected, so as to surround a periphery of the main positioning fitting portion 106.

In this case, a height of the main rotor peripheral wall 107 is formed higher than that of the main-side positioning fitting portion 106. Module mounting portions 108 are respectively formed at four side corners of the main rotor peripheral wall 107, that is, at four corners of a surface on the side to which the functional modules 200 to 500 connected to the housing body 102 are connected.

The module mounting portion 108 is a portion to which any one of the functional modules 200 to 500 is detachably mounted. In the present embodiment, the module mounting portion 108 includes a female thread having a thread formed on an inner peripheral surface of its bottomed hole. A mounting bolt 600, which will be described below, passing through the functional modules 200 to 500, is screw-fitted into the module mounting portion 108 including the female thread. In the present embodiment, in the module mounting portion 108, screw holes adjacent to each other are formed at equal intervals in an orthogonal direction, so that four screw holes are located at four corners of a square.

The lid 109 is a component for closing the inner chamber 103 formed in the housing body 102 in a liquid-tight manner and for supporting the main rotor 110. The lid 109 is configured such that a through-hole is formed in a central portion of a square plate when viewed from the axial direction of the main housing 101. The lid 109 has a bypass passage (not shown) formed to allow the fluid to flow between specific individual chambers in the four individual chambers formed in the inner chamber 103, and is provided with a regulating valve (not shown). The regulating valve is for adjusting a flow rate of the fluid flowing through the bypass passage.

The main rotor 110 is a component that is disposed in the inner chamber 103 of the main housing 101, divides the inner chamber 103 into the four individual chambers including four spaces together with the fixed vanes 104, and is rotated in the inner chamber 103, to increase or decrease a volume of each of the four individual chambers. The main rotor 110 mainly includes a shaft body 111 and the movable vane 114.

The shaft body 111 is a round bar-like portion that supports the movable vane 114. The shaft body 111 is made of an aluminum material, an iron material, a zinc material, or various resin materials such as a polyamide resin. The shaft body 111 is supported with the one end passing through the rotor support portion 105. Further, a tip end of the shaft body 111 passing through the rotor support portion 105 is exposed to an outside of the housing body 102, and forms a main-side connecting portion 112. On the other hand, the other end of the shaft body 111 is rotatably supported by the lid 109. Further, an accumulator 113 is fitted into the other end of the shaft body 111.

The main-side connecting portion 112 is a connecting portion with the mounting target to which the rotary damper 100 is mounted, or with the functional modules 200 to 500. The main-side connecting portion 112 is formed in a bottomed cylindrical shape having a circular cross-section. Further, the main-side connecting portion 112 is configured such that a flat portion extending in the axial direction, which is a rotation stop, is formed in a part of its outer peripheral portion. The accumulator 113 is a device for compensating for a volume change of the fluid 115 in the inner chamber 103 due to expansion or contraction due to a temperature change. The accumulator 113 is provided in a state of communicating with the inner chamber 103.

The movable vane 114 is a component for partitioning the inside of the inner chamber 103 into the spaces and increasing or decreasing the volume of each of the spaces in a liquid-tight manner. The movable vanes 114 respectively include plate-like bodies extending in a radial direction of the shaft body 111 (inner chamber 103). In this case, the two movable vanes 114 are formed to extend in opposite directions (in other words, on the virtual same plane) via the shaft body 111. Each of the movable vanes 114 has a groove recessed in a U-shape that is formed in its outer edge portion. A seal body 114a made of an elastic material such as a rubber material is fitted in the groove. As a matter of course, the two movable vanes 114 may be formed at positions different from the opposite directions (in other words, the same virtual plane) via the shaft body 111.

Each of the movable vanes 114 is provided with a throttle valve 114b. The throttle valve 114b allows the fluid to flow in a restricted manner between two adjacent individual chambers separated by the movable vane 114. Thus, the main rotor 110 rotates about an axis of the shaft body 111 while resisting a resistance generated when the fluid flows through the throttle valve 114b between the two individual chambers separated by the movable vane 114.

The fluid 115 is a substance for causing the rotary damper 100 to act as a damper by imparting resistance to the movable vanes 114 that rotate in the inner chamber 103. The fluid 115 is filled in the inner chamber 103. The fluid 115 is made of a liquid, gel-like or semi-solid substance having a viscous fluidity according to specifications of the rotary damper 100. In this case, a viscosity of the fluid 115 is appropriately selected according to the specifications of the rotary damper 100. In this embodiment, the fluid 115 is made of an oil such as mineral oil or silicone oil. In FIG. 2, the fluid 115 is shown by hatching in a broken line circle.

The functional modules 200 to 500 are devices for adjusting an input of a rotational driving force from the outside to the main rotor 110 of the rotary damper 100. The functional modules 200 to 500 are made of separate components that can be detachably mounted on the rotary damper 100. Here, adjustment of the input of the rotational driving force is to change at least one of the characteristics on the rotational driving force output from the mounting target on which the rotary damper 100 is mounted, and modes of transmission of rotational driving force, and to transmit it to the rotary damper 100.

In this case, characteristics of the rotational driving force include a rotational speed, a torque, and a direction of rotation. The modes of transmission of the rotational driving force include a transmission path of the rotational driving force that realizes a desired connection position, connection direction or posture of the rotary damper 100 with respect to a mounting target output portion of the mounting target. In addition, the modes of transmission of the rotational driving force include, for example, a connection structure that realizes a connection between the main-side connecting portion 112 and the mounting target output portion, which have different shapes or sizes, and a function-adding structure for shock absorption or the like when transmitting the rotational driving force. The functional modules 200 to 500 have adjustment functions on the rotational driving force, the connection structure, or the function-adding structure.

As illustrated in each of FIGS. 4 to 7, the functional module 200 is a device that applies an elastic force against the rotational driving force input from the outside such as the mounting target or other functional modules 300 to 500, and outputs the rotational driving force to the rotary damper 100 or the other functional modules 300 to 500. The functional module 200 is configured to mainly include a module housing 201 and an input adjustment mechanism 205.

The module housing 201 is a component that houses the input adjustment mechanism 205 and constitutes a housing of the functional module 200. The module housing 201 is formed by forming an aluminum material, an iron material, a zinc material, or various resin materials such as a polyamide resin into a hollow box shape. In this case, the module housing 201 is formed in an integral box shape by fastening a module housing body 201a and a lid 201b with screws. The module housing body 201a is formed in a box shape in which a portion housing the input adjustment mechanism 205 is deeply recessed and opened. The lid 201b covers an opening of the module housing body 201a. The module housing 201 is formed with an external mounting portion 202, the first module-side positioning fitting portion 203, a second module-side positioning fitting portion 204, and a module rotor peripheral wall 208.

The external mounting portion 202 is a portion for connecting the functional module 200 to the rotary damper 100 or the other functional modules 300 to 500. The external mounting portion 202 includes a through-hole through which the mounting bolt 600 passes. The external mounting portion 202 is formed at a position facing each of the four module mounting portions 108 formed in the housing body 102.

The first module-side positioning fitting portion 203 is a portion for positioning with the rotary damper 100 to be connected to each other. The first module-side positioning fitting portion 203 is formed in a cylindrical shape that can be fitted to the main-side positioning fitting portion 106 formed in the housing body 102. The first module-side positioning fitting portion 203 is formed to project from a wall surface of the module housing 201 facing a module output portion 206b of the input adjustment mechanism 205.

The second module-side positioning fitting portion 204 is a portion for positioning with the other functional modules 300 to 500 to be connected to each other. The second module-side positioning fitting portion 204 is formed in a cylindrical shape that can be fitted to each of the first module-side positioning fitting portions 303, 403, and 503 respectively formed in the other functional modules 300 to 500. The second module-side positioning fitting portion 204 is formed to project from a wall surface on which a module rotor 206 of the input adjustment mechanism 205 projects.

The input adjustment mechanism 205 is a group of components that applies the elastic force against the rotational driving force input from the outside of the functional module 200, and outputs the rotational driving force. The input adjustment mechanism 205 is configured to mainly include the module rotor 206 and elastic bodies 207a and 207b. The module rotor 206 is a component that is connected to the mounting target or the other functional modules 300 to 500 and is rotationally driven by receiving the rotational driving force from them. The module rotor 206 is formed by forming a metal material or a resin material into a round bar shape.

The module rotor 206 is rotatably supported by an inner peripheral portion of the second module-side positioning fitting portion 204, at one end side thereof. Further, the other end side of the module rotor 206 is rotatably supported by an inner peripheral portion of the first module-side positioning fitting portion 203. In this case, the module rotor 206 projects from the second module-side positioning fitting portion 204. The projecting portion forms a module input portion 206a that is connected to the mounting target or the other functional modules 300 to 500. In the present embodiment, the module input portion 206a is formed in a solid shaft shape corresponding to the cylindrical mounting target output portion. Further, in the module rotor 206, a portion supported by the first module-side positioning fitting portion 203 is formed in a cylindrical shape. This portion forms the module output portion 206b to which the main-side connecting portion 112 of the rotary damper 100 is fitted.

The module rotor 206 has an arm portion 206c. The arm portion 206c is a portion that receives the elastic forces from the elastic bodies 207a and 207b. The arm portion 206c is formed to project radially outwardly from an outer peripheral portion of the module rotor 206. A tip end of the arm portion 206c is pushed by the elastic bodies 207a and 207b in directions opposed to each other.

The elastic bodies 207a and 207b are components that apply the elastic forces against the direction of rotation to the module rotor 206. The elastic bodies 207a and 207b are provided in the module housing 201. In the present embodiment, the elastic bodies 207a and 207b are made of metal coil springs. One end of each of the elastic bodies 207a and 207b is fixed to the module housing 201. Further, the other ends of the elastic bodies 207a and 207b elastically push the arm portion 206c from both sides.

Thus, the module rotor 206 is positioned elastically stationary in a neutral position in clockwise and counterclockwise directions by the elastic forces of the elastic bodies 207a and 207b when the rotational driving force is not applied from the outside. In the present embodiment, the elastic bodies 207a and 207b are configured to exhibit different shock absorption characteristics in the clockwise and counterclockwise directions by using the elastic bodies having different strengths (spring constants). In this regard, the elastic bodies 207a and 207b can also be configured to exhibit the same shock absorbing characteristics in the clockwise and counterclockwise directions by using structure of the elastic bodies having the same strength.

The module rotor peripheral wall 208 is a portion for preventing foreign matter such as liquid including water, oil or the like and dust from adhering to and entering a connecting portion between the module input portion 206a of the module rotor 206 and the first module-side positioning fitting portions 303, 403 or 503, or the mounting target output portion of the mounting target, and its surroundings. The module rotor peripheral wall 208 is formed on a surface of the module housing 201 on a side to which the functional modules 300 to 500 or the mounting target is connected, so as to surround a periphery of the module input portion 206a and rise in a rectangular wall shape.

In this case, a height of the module rotor peripheral wall 208 is formed higher than that of the second module-side positioning fitting portion 204. The module rotor peripheral wall 208 has through-hole-shaped external mounting portions 202 respectively formed at its four side corners.

As illustrated in each of FIGS. 8 to 11, the functional module 300 is a device that increases and outputs the rotational driving force input from the outside. The functional module 300 is configured to mainly include a module housing 301 and an input adjustment mechanism 305.

Similar to the module housing 201, the module housing 301 is a component that houses the input adjustment mechanism 305 and constitutes a housing of the functional module 300. The module housing 301 is formed by forming an aluminum material, an iron material, a zinc material, or various resin materials such as a polyamide resin into a hollow box shape. In this case, the module housing 301 is formed in an integral box shape by fastening a module housing body 301a and a lid 301b with screws. The module housing body 301a is formed to be deeply recessed at a portion housing the input adjustment mechanism 305. The lid 301b covers an opening of the module housing body 301a. The module housing 301 is formed with an external mounting portion 302, the first module-side positioning fitting portion 303, and a boss 304.

The external mounting portion 302 is a portion for connecting the functional module 300 to the rotary damper 100 or another functional module 200. The external mounting portion 302 includes a through-hole through which the mounting bolt 600 passes. The external mounting portion 302 is formed at the position facing each of the four module mounting portions 108 formed in the housing body 102.

The first module-side positioning fitting portion 303 is a portion for positioning with the rotary damper 100 or with the other functional module 200 to be connected to each other. The first module-side positioning fitting portion 303 is formed in a cylindrical shape that can be fitted to the main-side positioning fitting portion 106 formed in the housing body 102 and the second module-side positioning fitting portion 204 formed in the other functional module 200. The first module-side positioning fitting portion 303 is formed to project from a wall surface of the module housing 301 facing a module output portion 307a of the input adjustment mechanism 305.

The boss 304 is a portion that supports a module rotor 306. The boss 304 is formed to project in a cylindrical shape from a wall surface of the lid 301b from which the module rotor 306 of the input adjustment mechanism 305 projects.

The input adjustment mechanism 305 is a group of components that increases and outputs the rotational driving force input from the outside of the functional module 300. The input adjustment mechanism 305 is configured to mainly include the module rotor 306 and an output shaft 307. The module rotor 306 is a component that is connected to the mounting target and is rotationally driven by receiving the rotational driving force from the mounting target. The module rotor 306 is formed by forming a metal material or a resin material into a round bar shape.

The module rotor 306 is rotatably supported by an inner peripheral portion of the boss 304, at one end side thereof. Further, a first gear 306b is formed on the other end side of the module rotor 306, and the first gear 306b is rotatably supported by the module housing 301. In this case, the module rotor 306 projects from the boss 304. This projecting portion constitutes a module input portion 306a connected to the mounting target.

The first gear 306b is a component that meshes with a second gear 307b to increase the rotational speed of the output shaft 307 with respect to the rotational speed of the module rotor 306, in other words, to reduce the torque of the output shaft 307 with respect to the torque of the module rotor 306. The first gear 306b is made of a spur gear that rotates integrally with the module rotor 306. In this case, the first gear 306b is formed to have a larger outer shape and a larger number of teeth than those of the second gear 307b.

The output shaft 307 is rotatably supported by the module housing 301, at one end side thereof. Further, the second gear 307b is formed on the other end side of the output shaft 307, and the second gear 307b is rotatably supported by the first module-side positioning fitting portion 303. In this case, the output shaft 307 is formed in a cylindrical shape at a portion supported by the first module-side positioning fitting portion 303. This portion constitutes the module output portion 307a to which the main-side connecting portion 112 of the rotary damper 100 or the module input portion 206a of the other functional module 200 is fitted.

The second gear 307b is a component that meshes with the first gear 306b to increase the rotational speed of the output shaft 307 with respect to the rotational speed of the module rotor 306, in other words, to reduce the torque of the output shaft 307 with respect to the torque of the module rotor 306. The second gear 307b is made of a spur gear that rotates integrally with the output shaft 307. In this case, the second gear 307b is formed to have a smaller outer shape and a smaller number of teeth than those of the first gear 306b.

Figure 12:
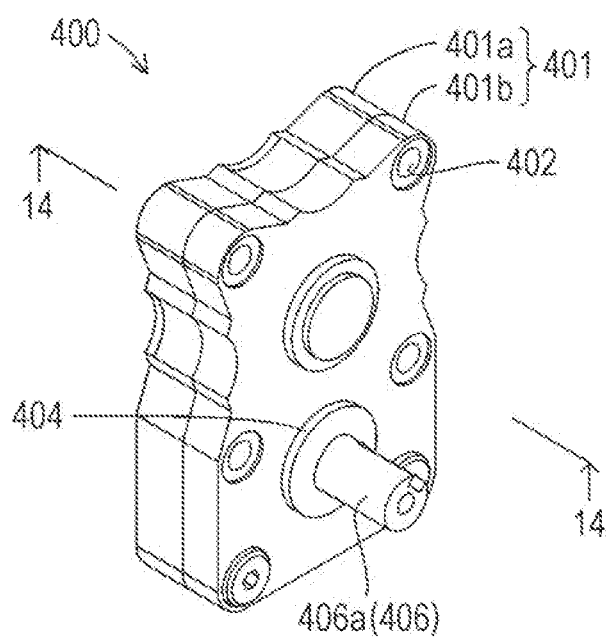
FIG. 12 is a perspective view schematically illustrating an external configuration of another functional module (deceleration function) connected to the rotary damper according to the present invention.
Figure 13:
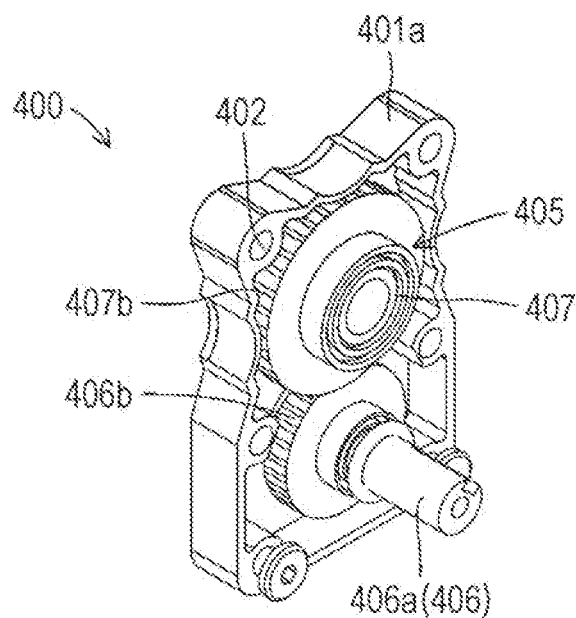
FIG. 13 is a perspective view illustrating the internal structure of the functional module shown in FIG. 12 with the lid omitted.
Figure 14:
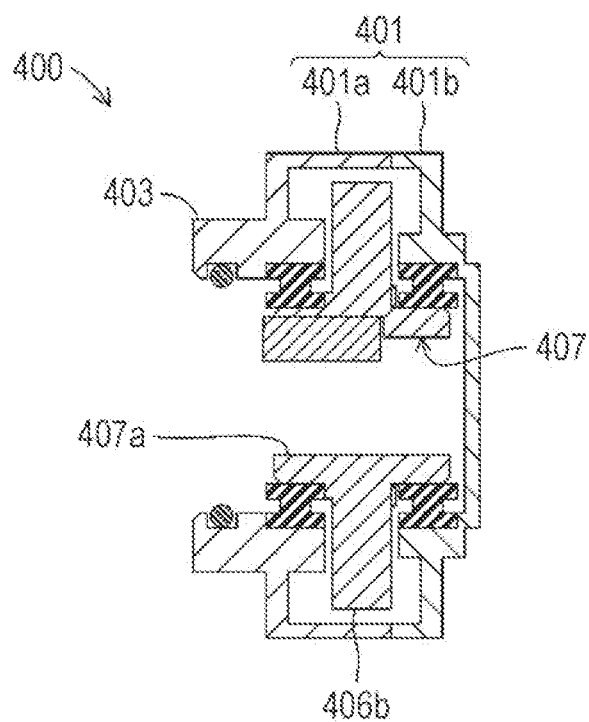
FIG. 14 is a cross-sectional view illustrating the schematic structure of the functional module taken along a line 14-14 shown in each of FIGS. 12 and 13.

As illustrated in each of FIGS. 12 to 14, the functional module 400 is a device that decelerates and outputs the rotational driving force input from the outside. The functional module 400 is configured to mainly include a module housing 401 and an input adjustment mechanism 405. The functional module 400 is different from the functional module 300 in that it includes a first gear 406b and a second gear 407b, which are respectively different from the first gear 306b and the second gear 307b, and has other configurations in common with the functional module 300. Therefore, description of these common portions will be omitted as appropriate.

That is, the functional module 400 includes the module housing 401, a module housing body 401a, a lid 401b, an external mounting portion 402, the first module-side positioning fitting portion 403, a boss 404, the input adjustment mechanism 405, a module rotor 406, a module input portion 406a, an output shaft 407, and a module output portion 407a, which are respectively similar to the module housing 301, the module housing body 301a, the lid 301b, the external mounting portion 302, the first module-side positioning fitting portion 303, the boss 304, the input adjustment mechanism 305, the module rotor 306, the module input portion 306a, the output shaft 307, and the module output portion 307a.

The first gear 406b is a component that meshes with the second gear 407b to reduce the rotational speed of the output shaft 407 with respect to the rotational speed of the module rotor 406, in other words, to increase the torque of the output shaft 407 with respect to the torque of the module rotor 406. The first gear 406b is made of a spur gear that rotates integrally with the module rotor 406. In this case, the first gear 406b is formed to have a smaller outer shape and a smaller number of teeth than those of the second gear 407b.

The second gear 407b is a component that meshes with the first gear 406b to reduce the rotational speed of the output shaft 407 with respect to the rotational speed of the module rotor 406, in other words, to increase the torque of the output shaft 407 with respect to the torque of the module rotor 406. The second gear 407b is made of a spur gear that rotates integrally with the output shaft 407. In this case, the second gear 407b is formed to have a larger outer shape and a larger number of teeth than those of the first gear 406b. In the functional modules 300 and 400, the first gears 306b and 406b and the second gears 307b and 407b, which are spur gears, are respectively used to form an acceleration mechanism and a deceleration mechanism. As a matter of course, other structures, such as those using planetary gears, may form the acceleration mechanism and the deceleration mechanism.

Figure 15:
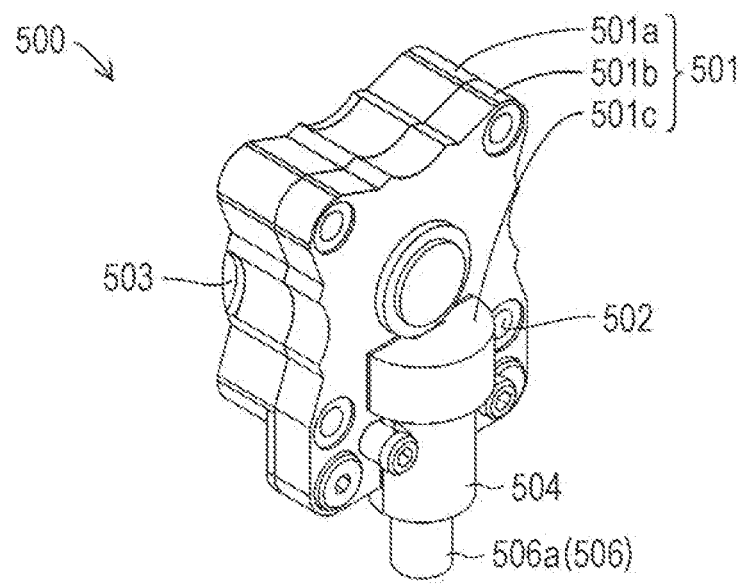
FIG. 15 is a perspective view schematically illustrating an external configuration of yet another functional module (change of input direction) connected to the rotary damper according to the present invention.
Figure 16:
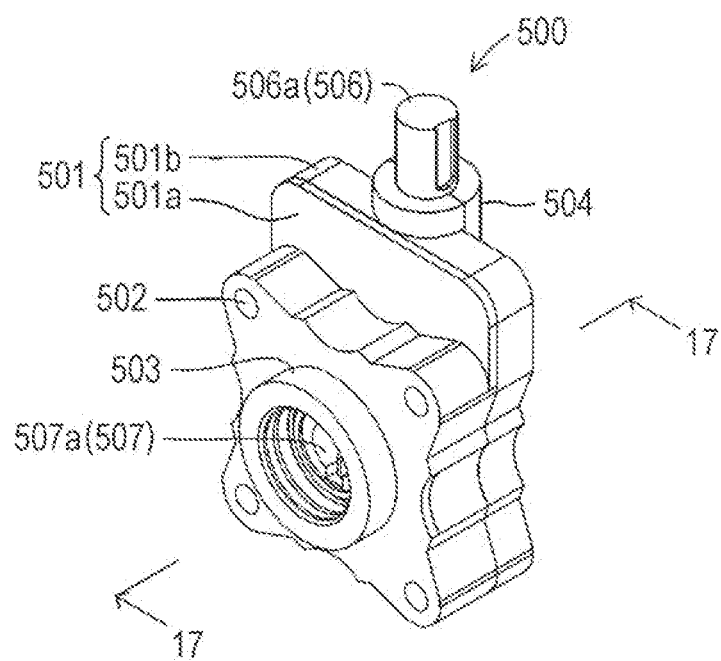
FIG. 16 is a perspective view schematically illustrating the external configuration of the opposite side of the functional module shown in FIG. 15.
Figure 17:
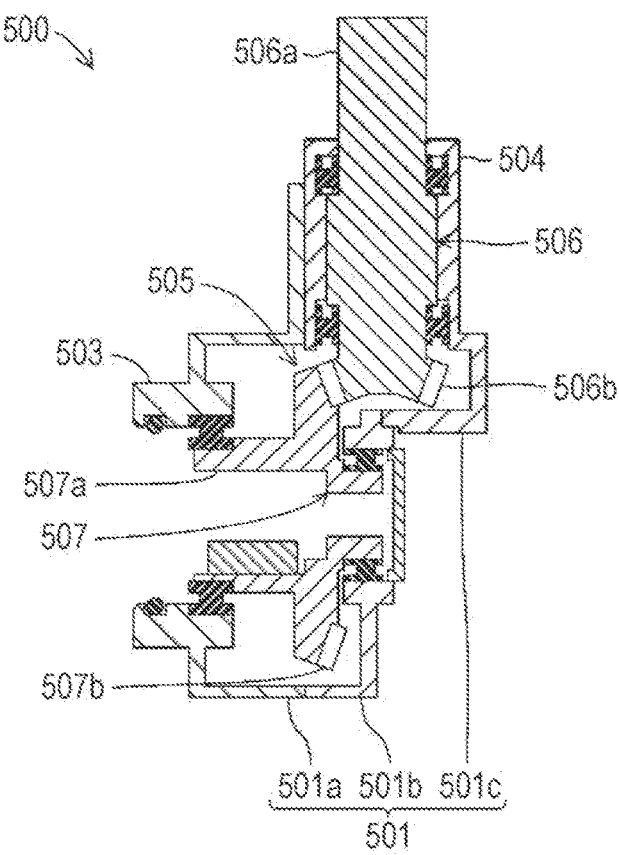
FIG. 17 is a cross-sectional view illustrating the schematic structure of the functional module taken along a line 17-17 shown in FIG. 16.

As illustrated in each of FIGS. 15 to 17, the functional module 500 is a device for inputting the rotational driving force from a direction different from the axial direction of the main-side connecting portion 112 in the rotary damper 100. The functional module 500 is configured to mainly include a module housing 501 and an input adjustment mechanism 505.

Similar to the module housing 201, the module housing 501 is a component that houses the input adjustment mechanism 505 and constitutes a housing of the functional module 500. The module housing 501 is formed by forming an aluminum material, an iron material, a zinc material, or various resin materials such as a polyamide resin into a hollow box shape. In this case, the module housing 501 is formed in an integral box shape by sandwiching a part of a tubular module housing second body 501c between a module housing first body 501a and a lid 501b and fastening them with screws. The module housing first body 501a is formed to be deeply recessed at a portion housing a part of the input adjustment mechanism 505. The lid 501b covers an opening of the module housing first body 501a. The module housing second body 501c houses another part of the input adjustment mechanism 505. The module housing 501 is formed with an external mounting portion 502, the first module-side positioning fitting portion 503, and a boss 504.

The external mounting portion 502 is a portion for connecting the functional module 500 to the rotary damper 100 or another functional module 200. The external mounting portion 502 includes a through-hole through which the mounting bolt 600 passes. The external mounting portion 502 is formed at the position facing each of the four module mounting portions 108 formed in the housing body 102.

The first module-side positioning fitting portion 503 is a portion for positioning with the rotary damper 100 or with the other functional module 200 to be connected to each other. The first module-side positioning fitting portion 503 is formed in a cylindrical shape that can be fitted to each of the main-side positioning fitting portion 106 formed in the housing body 102 and the second module-side positioning fitting portion 204 formed in the other functional module 200. The first module-side positioning fitting portion 503 is formed to project from a wall surface of the module housing 501 facing a module output portion 507a of the input adjustment mechanism 505.

The boss 504 is a portion that supports a module rotor 506. The boss 504 is formed to project in a cylindrical shape from the wall surface of the module housing 501 from which the module rotor 506 of the input adjustment mechanism 505 projects.

The input adjustment mechanism 505 is a group of components that inputs the rotational driving force from a direction different from the axial direction of the main-side connecting portion 112 in the rotary damper 100, and changes the transmission path of the rotational driving force to the same axial direction as the main-side connecting portion 112. The input adjustment mechanism 505 is configured to mainly include the module rotor 506 and an output shaft 507. The module rotor 506 is a component that is connected to the mounting target and is rotationally driven by receiving the rotational driving force from the mounting target. The module rotor 506 is formed by forming a metal material or a resin material into a round bar shape.

The module rotor 506 is rotatably supported by an inner peripheral portion of the boss 504, at one end side thereof. Further, a first gear 506b is formed on the other end side of the module rotor 506. In this case, the module rotor 506 projects from the boss 504. This projecting portion constitutes a module input portion 506a connected to the mounting target.

The first gear 506b is a component that meshes with a second gear 507b and transmits the rotational driving force of the module rotor 506 to the output shaft 507. The first gear 506b is made of a bevel gear that rotates integrally with the module rotor 506. In this case, the first gear 506b is formed to have a smaller outer shape and a smaller number of teeth than those of the second gear 507b, and is configured to reduce the rotational speed of the module rotor 506.

The output shaft 507 is rotatably supported by an inner peripheral portion of the first module-side positioning fitting portion 503, at one end side thereof. Further, the second gear 507b is formed on the other end side of the output shaft 507. In this case, the output shaft 507 is formed in a cylindrical shape at a portion supported by the first module-side positioning fitting portion 503. This portion constitutes the module output portion 507a to which the main-side connecting portion 112 of the rotary damper 100 or the module input portion 206a of the other functional module 200 is fitted.

The second gear 507b is a component that meshes with the first gear 506b and receives the rotational driving force of the module rotor 506. The second gear 507b is made of a bevel gear that rotates integrally with the output shaft 507. That is, the first gear 506b and the second gear 507b mesh with each other in a direction perpendicular to each other. Thus, the input adjustment mechanism 505 can change the transmission path of the rotational driving force input by the module rotor 506 in the direction perpendicular to each other. The first gear 506b and the second gear 507b are configured to reduce the rotational speed of the module rotor 506, but are not limited thereto. The first gear 506b and the second gear 507b may be configured to increase the rotational driving force of the module rotor 506, or may be configured to transmit the rotational driving force of the module rotor 506 as it is without reducing or increasing it.

(Operation of Rotary Damper 100)

Next, an operation of the rotary damper 100 thus configured will be described. The rotary damper 100 is provided between two components that are movably connected to each other. For example, in the rotary damper 100, the main housing 101 is mounted on one component that relatively rotates in the mounting target having a movable portion or in the prototype of the mounting targets, and the main rotor 110 is mounted on the other component. The mounting targets having a movable portion include the reclining mechanism of the seat, the tailgate, the opening and closing mechanism of the glove box in the automobile, the base end of the swing arm that vertically movably supports the rear wheel of the two-wheeled self-propelled vehicle (motorcycle), the hinge portion of the opening and closing door of the furniture, the elevating mechanism of the elevating shelf, and the like.

In this case, the rotary damper 100 can change the characteristics of the rotational driving force to the main rotor 110 and/or the mode of transmission of the rotational driving force by interposing the functional modules 200 to 500 between the main rotor 110 and the mounting target. Specifically, an operator who mounts the rotary damper 100 on the mounting target prepares each of the functional modules 200 to 500 having a required function among the functional modules 200 to 500, and the mounting bolts 600 together with the rotary damper 100. Then, the operator mounts the module housings 201, 301, 401 and 501 of the functional modules 200 to 500 on the main housing 101 of the rotary damper 100.

Figure 18:
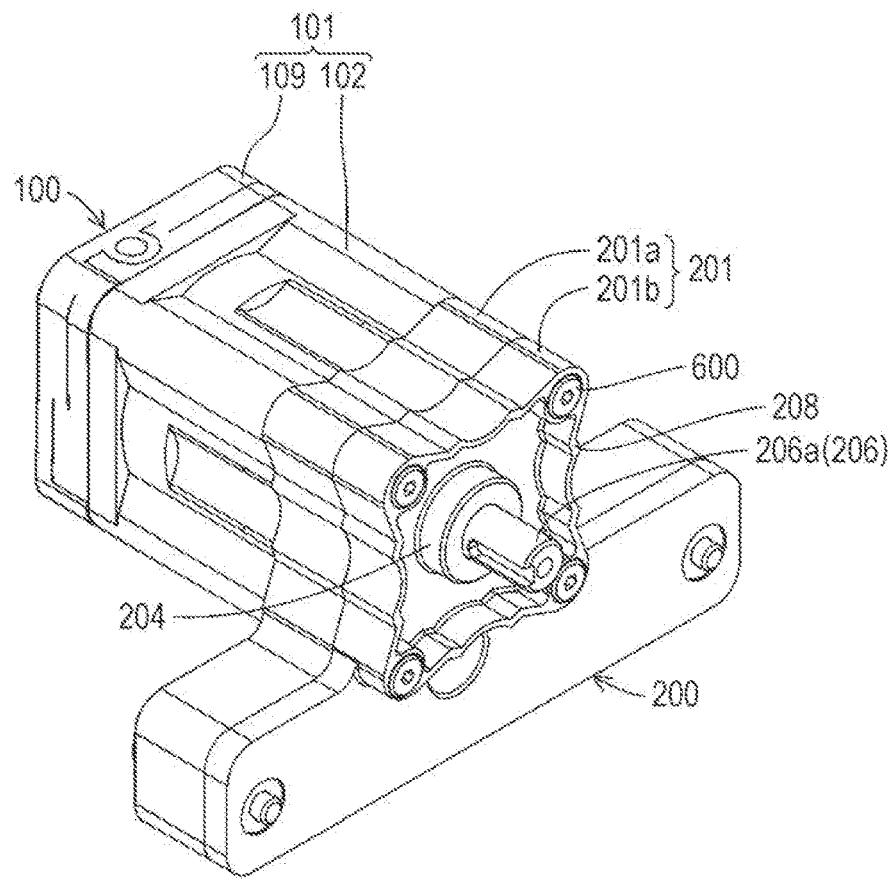
FIG. 18 is a perspective view schematically illustrating the external configuration with the functional module shown in FIG. 4 being connected to the rotary damper shown in FIG. 1.

For example, as illustrated in FIG. 18, when the operator wants to suppress an impact when the rotational driving force acts on the main rotor 110 of the rotary damper 100, the operator can provide the rotary damper 100 with the functional module 200. Specifically, the operator inserts the main-side connecting portion 112, which is a tip end of the main rotor 110 exposed projecting from the main housing 101 of the rotary damper 100, into the module output portion 206b, which is exposed and opened in the module housing 201 of the functional module 200, so that they are connected to each other. In this case, the operator fits a rod-shaped key (not shown) into key grooves respectively formed in the main-side connecting portion 112 of the main rotor 110 and the module output portion 206b, so that they are connected to each other to rotate integrally.

In this case, in the rotary damper 100 and the functional module 200, the main rotor 110 is inserted into the module output portion 206b, so that the main-side positioning fitting portion 106 and the first module-side positioning fitting portion 203 are fitted to each other. Thus, the functional module 200 is positioned in a plane perpendicular to the axial direction of the main rotor 110. Further, in the rotary damper 100 and the functional module 200, a connecting portion between the main-side connecting portion 112 and the module output portion 206b is covered by the main-side positioning fitting portion 106 and the first module-side positioning fitting portion 203. Therefore, it is possible to prevent foreign matter from entering the connecting portion.

Next, the operator aligns the four module mounting portions 108 formed in the main housing 101 of the rotary damper 100 respectively with the four external mounting portions 202 formed in the module housing 201 of the functional module 200. Thereafter, the operator passes the four mounting bolts 600 respectively through the external mounting portions 202 and tightens them respectively to the module mounting portions 108. In this case, the mounting bolt 600 is formed to have a length that allows it to pass through the module housing 201 and to be screwed into the module mounting portion 108 of the main housing 101. Thus, the main housing 101 and the module housing 201 are integrated, so that the functional module 200 is fixedly mounted on the rotary damper 100.

The four screw holes constituting the module mounting portion 108 are arranged at equal intervals in two orthogonal directions so as to form the four corners of the square. Therefore, the operator can mount the functional module 200 in a desired orientation by rotating the orientation of the functional module 200 with respect to the rotary damper 100 by every 90°. Specifically, when the module housing 201 is formed in a size or shape that projects from the outer edge portion of the main housing 101 of the rotary damper 100 as in the functional module 200, it is possible to prevent the functional module 200 from physically interfering with another article by adjusting a mounting orientation of the functional module 200 with respect to the rotary damper 100.

In this case, the functional module 200 is mounted in a state where a surface of the module housing 201 on the rotary damper 100 side is in close contact with a tip surface of the main rotor peripheral wall 107 formed in the main housing 101. Thus, the rotary damper 100 can prevent foreign matter from entering the connecting portion between the main-side connecting portion 112 and the module output portion 206*b*, and its surroundings. Further, the main rotor peripheral wall 107 is formed in a thin wall shape. Therefore, as compared with a case where the main housing 101 and the module housing 201 are in contact with each other on the entire surface between the two surfaces facing each other, it is possible to suppress them from being contact with each other with foreign matter sandwiched between them.

Figure 19:
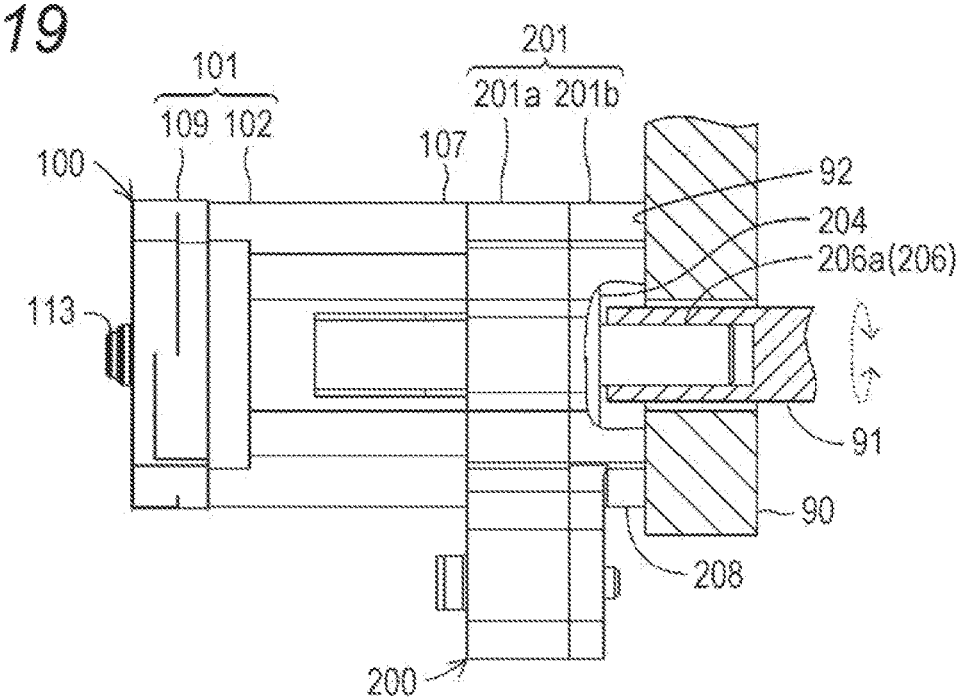
FIG. 19 is a partially broken side view schematically illustrating an external configuration of an assembly of the rotary damper and the functional module shown in FIG. 18 in a state of being mounted on a mounting target output portion in a mounting target.

Next, as illustrated in FIG. 19, the operator mounts the rotary damper 100 on which the functional module 200 is mounted on a mounting target 90. In this case, the operator mounts the module input portion 206*a* of the module rotor 206 exposed projecting from the module housing 201 of the functional module 200 on a mounting target output portion 91 to which the rotational driving force is output from the mounting target 90. Here, the mounting target output portion 91 is a cylindrical component to which one of the main-side connecting portion 112 and the module input portions 206*a*, 306*a*, 406*a*, 506*a* will be selectively fitted and connected. Further, the operator mounts the main housing 101 or the module housing 201 on a portion that rotates relative to the mounting target output portion 91 by using a fixture (not shown) such as a metal fitting.

In this case, the operator can integrally mount the rotary damper 100, the functional module 200, and the mounting target 90. Specifically, four through-holes having the same pitch as the module mounting portion 108 and the external mounting portion 202 are respectively formed at mounting positions of the rotary damper 100 in the mounting target 90. Further, the mounting bolt 600 is formed to have a length that allows it to pass through the mounting target 90 and the module housing 201 and to be screwed into the module mounting portion 108 of the main housing 101. Thus, the operator passes the mounting bolt 600 through the mounting target 90 and the module housing 201 and tightens it to the module mounting portion 108 of the main housing 101, so that the rotary damper 100 and the functional module 200 can be integrally mounted on the mounting target 90. According to this, the fixture is not necessary.

In this case, the functional module 200 is mounted in a state where a mounting surface 92 of the mounting target 90 on the module housing 201 side is in close contact with a tip surface of the module rotor peripheral wall 208 formed in the module housing 201. Thus, the rotary damper 100 can prevent foreign matter such as liquid including water, oil or the like and dust from adhering to and entering a connecting portion between the module input portion 206*a* and the mounting target output portion 91, and its surroundings. Further, the module rotor peripheral wall 208 is formed in a thin wall shape. Therefore, as compared with a case where the mounting target 90 and the module housing 201 are in contact with each other on the entire surface between the two surfaces facing each other, it is possible to suppress them from being contact with each other with foreign matter sandwiched between them.

The rotational driving force is input to the rotary damper 100 mounted in this way from the mounting target output portion 91 of the mounting target 90 via the functional module 200 (see a broken arrow in FIG. 19). Specifically, in the rotary damper 100, the rotational driving force input to the module rotor 206 in a state where an impact in a rotational drive direction acting on the module rotor 206 from the mounting target output portion 91 is buffered by the elastic bodies 207*a* and 207*b* is transmitted to the main rotor 110. Thus, in the rotary damper 100, the main rotor 110 rotates while resisting the resistance of the fluid 115 by the rotational driving force input via the functional module 200. When the rotational driving force does not act on the module rotor 206, the rotary damper 100 rotates to a central portion in two directions of rotation (clockwise and counterclockwise) and stands still here, by the elastic forces of the elastic bodies 207*a* and 207*b*.

In the above operation description, a case where the functional module 200 is mounted on the rotary damper 100 is described. However, instead of the functional module 200, the other functional modules 300 to 500 can also be similarly mounted on the rotary damper 100. In this case, by mounting the functional module 300 on the rotary damper 100, the rotational driving force input to the module rotor 306 of the functional module 300 can be increased and transmitted to the main rotor 110. Further, by mounting the functional module 400 on the rotary damper 100, the rotational driving force input to the module rotor 406 of the functional module 400 can be decreased and transmitted to the main rotor 110. Furthermore, by mounting the functional module 500 on the rotary damper 100, the rotational driving force can be input from a direction perpendicular to the axial direction of the main rotor 110.

Figure 20:
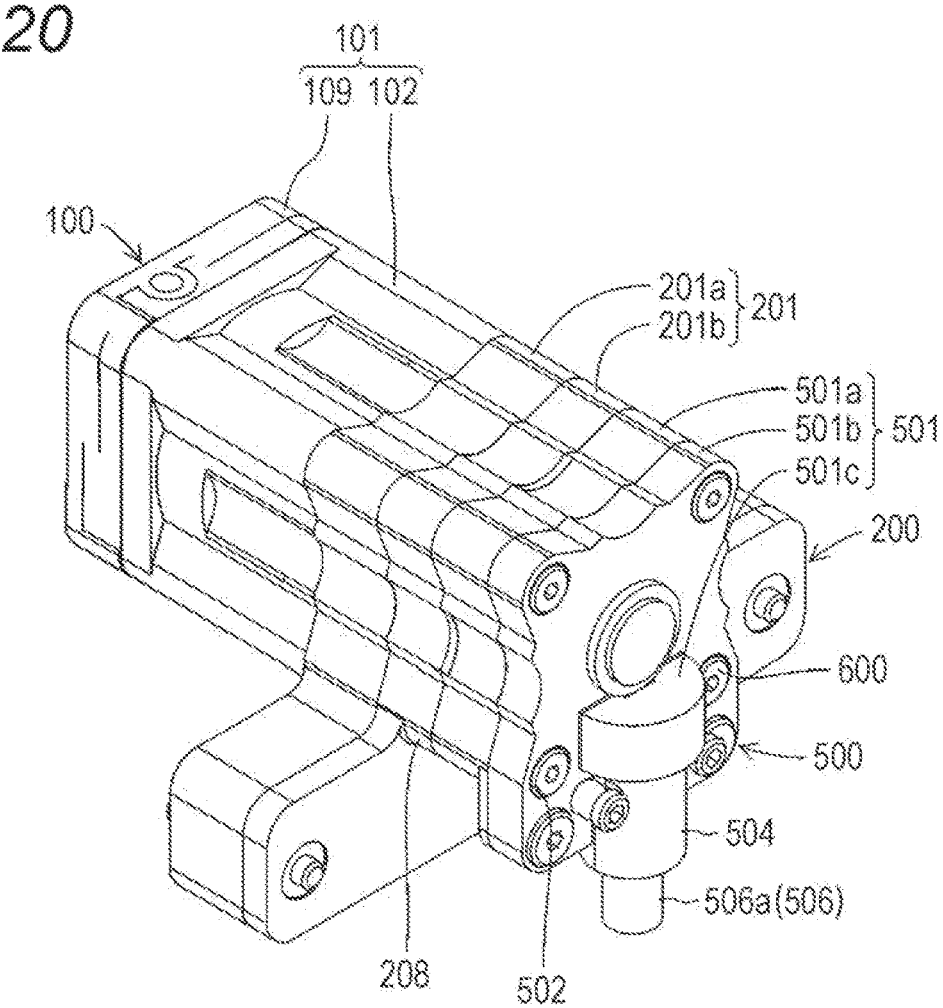
FIG. 20 is a perspective view schematically illustrating an external configuration in a state where the functional module shown in FIG. 15 is further connected to the assembly of the rotary damper and the functional module shown in FIG. 18.

In addition to the functional module 200, the other functional modules 300 to 500 can be mounted on the rotary damper 100. For example, as illustrated in FIG. 20, the operator can mount the functional module 500 on the rotary damper 100 in addition to the functional module 200. Specifically, the operator inserts the main-side connecting portion 112 of the main rotor 110 in the rotary damper 100 into the module output portion 206*b* of the functional module 200. Thereafter, the operator further inserts the module input portion 206a of the module rotor 206 in the functional module 200 into the module output portion 507a, which is exposed and opened from the module housing 501 of the functional module 500, so that they are connected to each other. In this case, the operator inserts the rod-shaped key into key grooves respectively formed in the module input portion 206a of the module rotor 206 and the module output portion 507a, so that they are connected to each other to rotate integrally.

In this case, in the functional module 200 and the functional module 500, the module input portion 206a of the module rotor 206 is inserted into the module output portion 507a, so that the second module-side positioning fitting portion 204 and the first module-side positioning fitting portion 503 are fitted to each other. Thus, the functional module 500 is positioned in a plane perpendicular to the axial direction of the module rotor 206 of the functional module 200.

In the functional module 200 and the functional module 500, a connecting portion between the module input portion 206a and the module output portion 507a is covered by the second module-side positioning fitting portion 204 and the first module-side positioning fitting portion 503. Therefore, it is possible to prevent foreign matter from entering the connecting portion. Further, the functional module 200 and the functional module 500 are mounted via the module rotor peripheral wall 208. Therefore, it is possible to prevent foreign matter such as liquid including water, oil or the like and dust from adhering to and entering the connecting portion between the module input portion 206a and the module output portion 507a, and its surroundings.

Next, the operator aligns the external mounting portions 202 of the functional module 200 and the external mounting portions 502 of the functional module 500 respectively with the module mounting portions 108 formed in the main housing 101 of the rotary damper 100. Thereafter, the operator passes the four mounting bolts 600 respectively through the external mounting portions 202 and 502 and tightens them respectively to the module mounting portions 108. In this case, the mounting bolt 600 is formed to have a length that allows it to pass through the module housings 201 and 501 and to be screwed into the module mounting portion 108 of the main housing 101.

Thus, the module housings 201 and 501 are integrated with the main housing 101, so that the functional modules 200 and 500 are fixedly mounted on the rotary damper 100. In this case, in the functional module 500, the axial direction of the module rotor 506 for inputting an external force extends in the direction perpendicular to the axial direction of the main rotor 110 of the rotary damper 100.

Next, the operator mounts the rotary damper 100 on which the functional module 200 and the functional module 500 are mounted on the mounting target 90 (not shown) in the same manner as described above. In this case, the axial direction of the module rotor 506 extends in the direction perpendicular to the axial direction of the main rotor 110. Therefore, the rotary damper 100 can input the rotational driving force from the perpendicular direction.

The rotational driving force is input to the rotary damper 100 mounted in this way from the mounting target output portion 91 (not shown) of the mounting target 90 via the functional module 500 and the functional module 200. Specifically, in the rotary damper 100, the rotational driving force acting on the module rotor 506 from the mounting target 90 is transmitted in the perpendicular direction via the input adjustment mechanism 505. Thereafter, the rotational driving force is transmitted to the module rotor 206 of the functional module 200 via the module output portion 507a.

Next, in the rotary damper 100, the rotational driving force input to the module rotor 206 in a state where the impact in the rotational drive direction acting on the module rotor 206 is buffered by the elastic bodies 207a and 207b is transmitted to the main rotor 110. Thus, in the rotary damper 100, the main rotor 110 rotates while resisting the resistance of the fluid 115 by the rotational driving force input via the functional modules 200 and 500. When the rotational driving force does not act on the module rotor 206, the rotary damper 100 rotates to the central portion in two directions of rotation (clockwise and counterclockwise) and stands still here, by the elastic forces of the elastic bodies 207a and 207b.

In the above operation description, the operator temporarily connects the functional module 500 to the functional module 200 that is temporarily connected to the rotary damper 100. However, the operator may temporarily connect the functional module 200, to which the functional module 500 is temporarily connected, to the rotary damper 100.

In the rotary damper 100, the functional module 500 is mounted on the functional module 200. However, in the rotary damper 100, the functional modules 300 and 400 can be mounted on the functional module 200 in place of or in addition to the functional module 500.

When the operator changes the specifications of the rotational driving force input to the rotary damper 100, the operator can loosen screw fitting of the mounting bolts 600 and remove them from the main housing 101, to remove the functional modules 200 to 500. Thus, the operator can mount new functional modules 200 to 500 to the rotary damper 100 alone or in combination as appropriate.

As can be understood from the description of the above operation method, according to the above embodiment, the rotary damper 100 detachably includes the functional modules 200 to 500 including the input adjustment mechanisms 205, 305, 405 and 505 capable of changing the specifications of the rotational driving force input to the main rotor 110. Therefore, the specifications can be easily changed by mounting the functional modules 200 to 500 having a desired function alone or in combination. Further, since an existing rotary damper can be continued to be used, economic efficiency can be improved.

Furthermore, implementation of the present invention is not limited to the above embodiment, and various changes can be made without departing form an object of the present invention.

For example, in the above embodiment, the rotary damper 100 is configured to include four functional modules 200 to 500 having different functions from each other. However, the rotary damper 100 may be configured to include a plurality of functional modules 200 to 500 respectively having the same type of functions. Further, the rotary damper 100 may be configured to include a functional module having a function different from that of the functional modules 200 to 500.

In this case, the functional module can be configured to have, for example, a function of reversing a direction of the rotational driving force input from the mounting target and inputting the rotational driving force to the main rotor 110 of the rotary damper 100. Specifically, this functional module can be prepared by forming the first gears 306b and 406b and the second gears 307b and 407b in the functional modules 300 and 400 so as to have the same outer diameter and the same number of teeth. Further, in this case, in the functional module, the axial direction of the module input portion and the axial direction of the module output portion are located at different positions from each other. Therefore, when the rotary damper 100 cannot be placed in the axial direction of the mounting target output portion to which the rotational driving force from the mounting target is output, the rotary damper 100 can also be placed at a position shifted from the axial direction of the mounting target output portion.

When a physical distance between the mounting target output portion to which the rotational driving force from the mounting target is output, and the main-side connecting portion 112 of the rotary damper 100 is greater than a length of the main-side connecting portion 112, the functional module can be configured to have a function of connecting the two. Specifically, in the functional module, the arm portion 206c is removed from the module rotor 206 of the functional module 200, and the elastic bodies 207a and 207b are removed. Then, a length of the module rotor 206 is formed to be longer than or equal to the physical distance between the mounting target output portion and the main-side connecting portion 112 of the rotary damper 100. Thus, the functional module can transmit the rotational driving force by connecting the mounting target output portion and the main-side connecting portion 112, which are physically separated from each other, to each other.

When an outer diameter of the main-side connecting portion 112 of the rotary damper 100, and the mounting target output portion to which the rotational driving force from the mounting target is output do not match and they cannot be connected to each other, the functional module can be configured to have the function of connecting the two. Specifically, in this functional module, for example, in the functional modules 200 to 500, the module input portions 206a, 306a, 406a and 506a may be formed to have an outer diameter that can be connected to the main-side connecting portion 112, and the module output portions 206b, 307a, 407a and 507a may be formed to have an outer diameter that can be connected to the mounting target output portion.

In the above embodiment, the main-side connecting portion 112 and the module input portions 206a, 306a, 406a and 506a are each formed in a shaft shape. This is assumed that the mounting target output portion is made of a tubular shaft body like the mounting target output portion 91 illustrated in FIG. 19. Therefore, when it is assumed that the module input portions 206a, 306a, 406a and 506a are fitted onto the mounting target output portion (for example, when the mounting target output portion is made of a solid shaft body), the module input portions 206a, 306a, 406a and 506a can be made of the tubular shaft body.

The functional module need only have a function of changing at least one of the characteristics on the rotational driving force input from the outside of the functional module and the mode on an output of the rotational driving force. In this case, regarding the characteristics of the rotational driving force, there is a function of changing the rotational speed, the torque, and the direction of rotation. Regarding the mode on the output of the rotational driving force, the module input portion of the module rotor has a function of changing a length, a shaft diameter (or a hole diameter), a direction of formation and a position of formation of the main-side connecting portion, or a function of adding a function such as shock absorption. Then, the functional module can be configured to include each of the functions alone or to include a plurality of functions at the same time.

The functional module 200 is configured to apply the elastic forces of the elastic bodies 207a and 207b from both of two rotational drive directions of the module rotor 206. However, the functional module 200 can also be configured to apply the elastic force of the elastic body 207a or the elastic body 207b to only one of the two rotational drive directions of the module rotor 206. Further, the elastic bodies 207a and 207b may be made of leaf springs or torsion springs in addition to the coil springs. Alternatively, the elastic bodies 207a and 207b can be made by using repulsive force or attractive force of two magnets.

The rotary damper 100 may be configured to include a plurality of functional modules, but may also be configured to include only one functional module. In this case, the external mounting portion of the module housing need only be configured such that only the module mounting portion 108 in the rotary damper 100 can be mounted, and it is not necessary to be configured such that the other functional modules can be mounted.

In the above embodiment, the external mounting portion 202 of the functional module 200 is configured to be selectively mountable on the rotary damper 100 or the modules 300 to 500. On the other hand, the external mounting portions 302, 402 and 502 of the functional modules 300 to 500 are configured to be mountable only on the rotary damper 100. That is, the external mounting portion 202 is configured to include another module mounting portion according to the present invention. Therefore, in the functional modules 300 to 500, the external mounting portions 302, 402 and 502 can also be configured to be selectively mountable on each of the other functional modules 300 to 500 in addition to the rotary damper 100.

In the functional modules 200 to 500, the external mounting portions 202, 302, 402 and 502 can also be formed to be mountable only on the rotary damper 100. In this case, it is necessary to provide the functional modules 200 to 500 with other module mounting portions for mounting the other functional modules 200 to 500, separately from the external mounting portions 202, 302, 402 and 502. Here, the other module mounting portions can be made of, for example, a press-fit pin and a fitting hole, a male thread and a female thread, a hook-shaped hook portion and a recessed hooked portion, or a magnet and a magnet (or a magnetic material), which allow two of the module housings 201, 301, 401 and 501 to be detachably mounted on each other.

The module mounting portion 108 and the external mounting portions 202, 302, 402 and 502 can also be made of a structure other than the male thread and the female thread, for example, the press-fit pin and the fitting hole, the hook-shaped hook portion and the recessed hooked portion, or the magnet and the magnet (or the magnetic material). Further, when the module mounting portion 108 is made of the female thread, a position at which the module mounting portion 108 is formed and the number of the module mounting portions may be appropriately set as necessary. Therefore, the module mounting portions 108 may be arranged at corners of a rectangle or another polygon (for example, a triangle or a hexagon) instead of the corners of the square.

In the above embodiment, the main-side connecting portion 112 is made of the shaft body, and the module output portions 206b, 307a, 407a and 507a are made of the tubular body to which the main-side connecting portion 112 is fitted. However, the main-side connecting portion 112 and the module output portions 206b, 307a, 407a and 507a need only be configured to be detachably connected to each other. Therefore, for example, the module output portions 206b, 307a, 407a and 507a can be made of the shaft body, and the main-side connecting unit 112 can be made of the cylinder body to which the module output portions 206b, 307a, 407a and 507a are fitted.

In the structure of the above embodiment, the main housing 101 is provided with the main-side positioning fitting portion 106. Further, the module housings 201, 301, 401 and 501 are respectively provided with the first module-side positioning fitting portions 203, 303, 403 and 503. Then, the first module-side positioning fitting portions 203, 303, 403 and 503 are selectively mounted on the main-side positioning fitting portion 106. That is, they correspond to the positioning fitting portion according to the present invention.

In this case, the main-side positioning fitting portion 106 and the first module-side positioning fitting portions 203, 303, 403 and 503 are configured such that the first module-side positioning fitting portions 203, 303, 403 and 503 are fitted onto the main-side positioning fitting portion 106. However, the main-side positioning fitting portion 106 and the first module-side positioning fitting portions 203, 303, 403 and 503 can also be configured such that the first module-side positioning fitting portions 203, 303, 403 and 503 are fitted into the main-side positioning fitting portion 106. Further, the main-side positioning fitting portion 106 and the first module-side positioning fitting portions 203, 303, 403 and 503 can also be made of the press-fit pin and the fitting hole not around the main rotor 110 and the module rotors 206, 306, 406 and 506 but at a position away from them. Further, the main housing 101 and the module housings 201, 301, 401 and 501 can also be configured such that the main-side positioning fitting portion 106 and the first module-side positioning fitting portions 203, 303, 403 and 503 are omitted.

In the above embodiment, the second module-side positioning fitting portion 204 in the module housing 201 is configured to be fittable to each of the second module-side positioning fitting portions 304, 404 and 504 in the module housings 301, 401 and 501. In this case, the second module-side positioning fitting portions 304, 404 and 504 are formed not fittable to the other second module-side positioning fitting portions 304, 404 and 504 other than the second module-side positioning fitting portion 204. However, the second module-side positioning fitting portions 304, 404 and 504 can also be formed fittable to the other second module-side positioning fitting portions 304, 404 and 504 in addition to the second module-side positioning fitting portion 204. Further, the module housings 201, 301, 401 and 501 can also be configured such that the main-side positioning fitting portion 106 and the second module-side positioning fitting portions 204, 304, 404 and 504 are omitted.

In the above embodiment, the main housing 101 is provided with a main rotor peripheral wall 107 as a thin plate-like wall body formed in a continuous ring shape on a surface facing the module housings 201, 301, 401 and 501. However, the main rotor peripheral wall 107 can also be a thin plate-like wall body formed in an intermittent ring shape. Further, the main housing 101 can also be configured such that the main rotor peripheral wall 107 is omitted. Further, the module rotor peripheral wall 208 may also be provided on the functional modules 300 to 500 other than the functional module 200, or may be a thin plate-like wall body formed in an intermittent ring shape. Furthermore, the module housing 201 can also be configured such that the module rotor peripheral wall 208 is omitted.

In the structure of the above embodiment, the inside of the inner chamber 103 of the rotary damper 100 is divided into the four individual chambers. However, the inner chamber 103 of the rotary damper 100 need only be partitioned into at least two or more individual chambers.

The rotary damper 100 can be used by being mounted on a mechanical device, an electric device, or an instrument other than the mounting target having a movable portion. The mounting targets having a movable portion include the reclining mechanism of the seat, the tailgate, the opening and closing mechanism of the glove box in the automobile, the base end of the swing arm that vertically movably supports the rear wheel of the two-wheeled self-propelled vehicle (motorcycle), the hinge portion of the opening and closing door of the furniture, the elevating mechanism of the elevating shelf, and the like.

LIST OF REFERENCE SIGNS

90: Mounting target, 91: Mounting target output portion, 92: Mounting surface, 100: Rotary damper, 101: Main housing, 102: Housing body, 103: Inner chamber, 104: Fixed vane, 104a: Seal body, 105: Rotor support portion, 106: Main-side positioning fitting portion, 107: Main rotor peripheral wall, 108: Module mounting portion, 109: Lid, 110: Main rotor, 111: Shaft body, 112: Main-side connecting portion, 113: Accumulator, 114: Movable vane, 114a: Seal body, 114b: Throttle valve, 115: Fluid, 200: Functional module, 201: Module housing, 201a: Module housing body, 201b: Lid, 202: External mounting portion, 203: First module-side positioning fitting portion, 204: Second module-side positioning fitting portion, 205: Input adjustment mechanism, 206: Module rotor, 206a: Module input portion, 206b: Module output portion, 206c: Arm portion, 207a, 207b: Elastic body, 208: Module rotor peripheral wall, 300, 400: Functional module, 301, 401: Module housing, 301a, 401a: Module housing body, 301b, 401b: Lid, 302, 402: External mounting portion, 303, 403: First module-side positioning fitting portion, 304, 404: Boss, 305, 405: Input adjustment mechanism, 306, 406: Module rotor, 306a, 406a: Module input portion, 306b, 406b: First gear, 307, 407: Output shaft, 307a, 407a: Module output portion, 307b, 407b: Second gear, 500: Functional module, 501: Module housing, 501a: Module housing first body, 501b: Lid, 501c: Module housing second body, 502: External mounting portion, 503: First module-side positioning fitting portion, 504: Boss, 505: Input adjustment mechanism, 506: Module rotor, 506a: Module input portion, 506b: First gear, 507: Output shaft, 507a: Module output portion, 507b: Second gear, 600: Mounting bolt.

The invention claimed is:

1. A rotary damper comprising a main housing that holds a main rotor rotating against a resistance of a fluid together with the fluid in a state in which the main rotor has at least an exposed portion, comprising
a functional module detachably mounted on the main housing,
wherein the main housing has a module mounting portion for detachably mounting the functional module,
the functional module comprises:
an input adjustment mechanism having both a module rotor that is rotationally driven by receiving a rotational driving force from outside the functional module, and a module output portion that is formed to be connectable to at least the main rotor and transmits the rotational driving force, and having a function of changing at least one of characteristics of the rotational driving force and modes of transmission of the rotational driving force between the module rotor and the module output portion;

a module housing that houses the input adjustment mechanism; and an external mounting portion provided on the module housing for detachably mounting the rotary damper, the functional module includes a plurality of functional modules having the function of the same type and/or a different type, the module housing includes another module mounting portion for detachably mounting the other functional module, and the module output portion is formed to be connectable to the module rotor in the other functional module.

2. The rotary damper according to claim 1, wherein the module mounting portion includes a plurality of female threads formed at different positions around the main rotor in the main housing, and the external mounting portion and the other module mounting portion include common through-holes which are formed at positions respectively facing the plurality of female threads and through which male threads screwed into the female threads can pass.

3. The rotary damper according to claim 1, wherein the main rotor is formed in a rod shape projecting from the main housing and connected to the input adjustment mechanism.

4. The rotary damper according to claim 1, wherein the module housing includes a module rotor peripheral wall that surrounds a periphery of an exposed portion of the module rotor and is in close contact with a module mounting target to which the module rotor is connected.

5. The rotary damper according to claim 1, wherein the input adjustment mechanism includes an elastic body that applies an elastic force to the module rotor against its direction of rotation.

6. A rotary damper comprising a main housing that holds a main rotor rotating against a resistance of a fluid together with the fluid in a state in which the main rotor has at least an exposed portion, comprising a functional module detachably mounted on the main housing, wherein the main housing has a module mounting portion for detachably mounting the functional module, the functional module comprises:

an input adjustment mechanism having both a module rotor that is rotationally driven by receiving a rotational driving force from outside the functional module, and a module output portion that is formed to be connectable to at least the main rotor and transmits the rotational driving force, and having a function of changing at least one of characteristics of the rotational driving force and modes of transmission of the rotational driving force between the module rotor and the module output portion;

a module housing that houses the input adjustment mechanism; and an external mounting portion provided on the module housing for detachably mounting the rotary damper, the main housing and the module housing include positioning fitting portions that are fitted to each other to determine their positions on surfaces facing each other when they are connected to each other, the main housing includes a main rotor peripheral wall that surrounds a periphery of the exposed portion of the main rotor and is in close contact with the module housing, the main rotor peripheral wall surrounds the positioning fitting portion of the main housing, and a height of the main rotor peripheral wall is longer than a height of the positioning fitting portion of the main housing when viewed in a direction perpendicular to a surface of the main housing facing the functional module.

* * * * *